United States Patent [19]

Martin, Jr. et al.

[11] Patent Number: 4,925,695
[45] Date of Patent: May 15, 1990

[54] PROCESS OF REFINING SACCHARIDE CRYSTALS DURING FOOD PROCESSING

[75] Inventors: Robert A. Martin, Jr.; David M. Stumpf, both of Palymra, Pa.

[73] Assignee: Hershey Foods Corporation, Hershey, Pa.

[21] Appl. No.: 228,701

[22] Filed: Aug. 4, 1988

[51] Int. Cl.$^5$ .......................... A23G 1/00; A23G 3/00
[52] U.S. Cl. ...................................... 426/660; 426/658
[58] Field of Search .................. 426/660, 658; 127/29, 127/30

[56] References Cited

U.S. PATENT DOCUMENTS

| | | | |
|---|---|---|---|
| 2,451,630 | 10/1948 | McGee | 426/660 |
| 2,459,908 | 1/1949 | Alkonis | 426/660 |
| 2,465,828 | 3/1949 | Alkonis | 426/660 |
| 2,574,948 | 11/1951 | Alkonis | 426/660 |
| 2,760,867 | 8/1956 | Kempf | 426/660 |
| 2,863,772 | 12/1958 | Kempf | 426/660 |
| 3,745,022 | 7/1973 | Broeg et al. | 426/660 |
| 4,017,645 | 4/1977 | Ziccarelli | 426/660 |
| 4,042,721 | 8/1977 | Ziccarelli | 426/660 |

OTHER PUBLICATIONS

L. E. Slater, "Radical Pulverizing Technique . . . " Food Engineering, Jul., 1952, pp. 62–64, 134, 136.

*Primary Examiner*—Jeanette Hunter
*Attorney, Agent, or Firm*—Paul & Paul

[57] ABSTRACT

In an improved process for producing food products, such as confections, including milk and dark chocolate, a crystalline saccharide such as sucrose, and a fat such as cocoa butter, are blended with a minor amount of water. The blend is refined, such as by passing it through the nip of at least one pair of refining rolls, to produce particles having a size less than about 50 micrometers. The minor amount of water is effective to dissolve saccharide particles having a size less than about five micrometers. Subsequently, the refined product is heated and agitated to remove the minor amount of water. The resulting semi-processed food ingredient is useful for producing food products having improved viscosity characteristics.

7 Claims, 2 Drawing Sheets

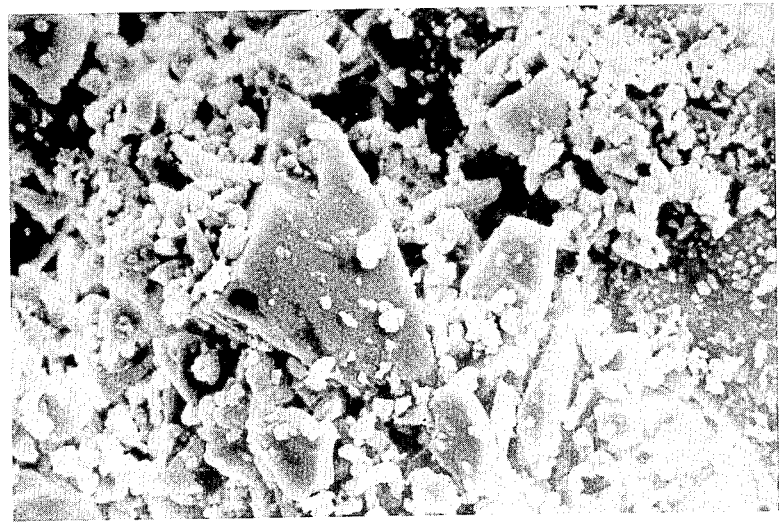
FIG. 1 2000x ⊢──⊣ 10 μm
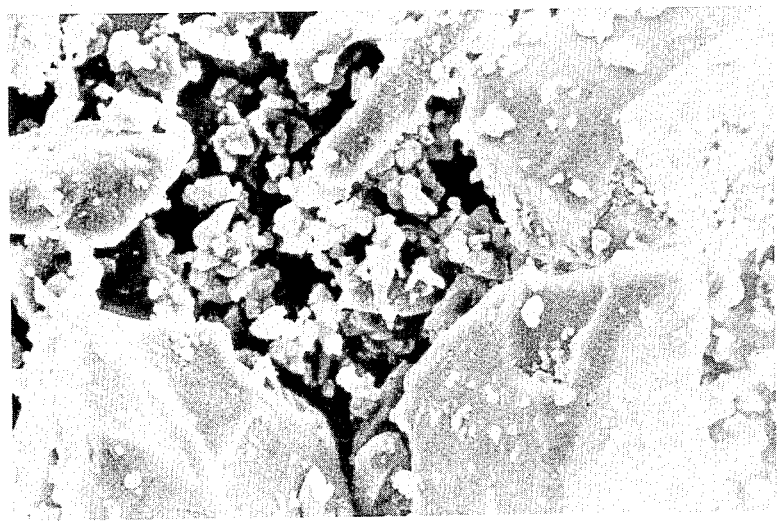
FIG. 2 2000x ⊢──⊣ 10 μm

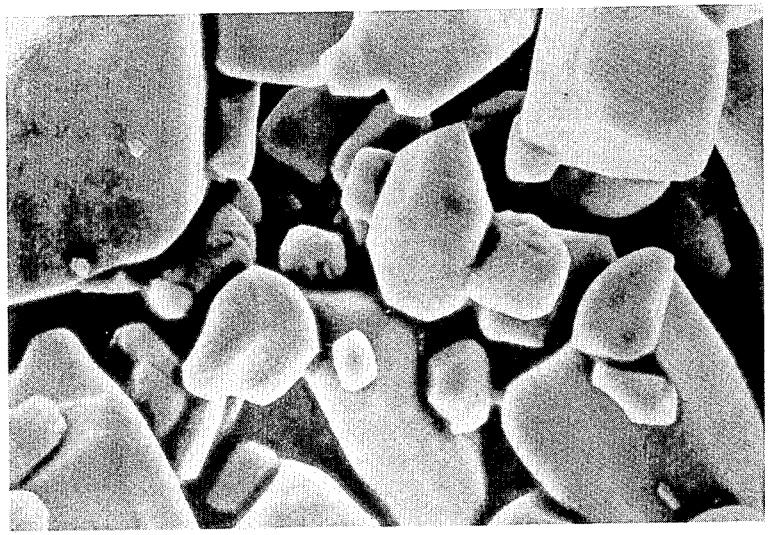
FIG. 3 2000x ⊢———⊣ 10 μm
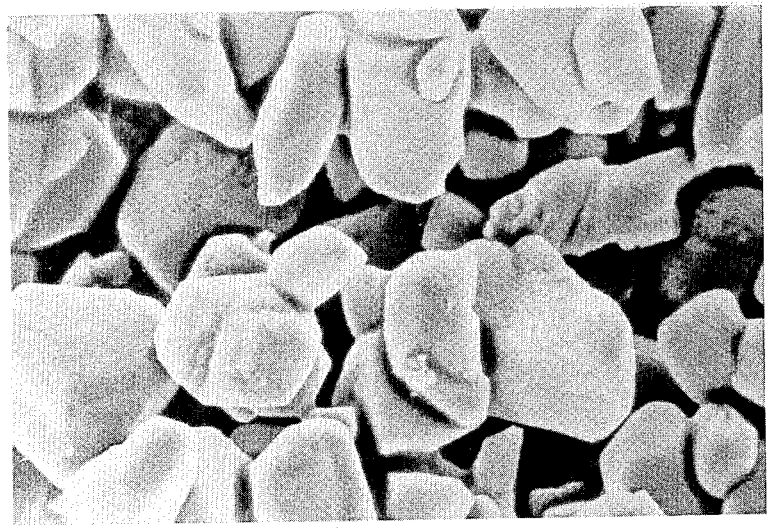
FIG. 4 2000x ⊢———⊣ 10 μm

PROCESS OF REFINING SACCHARIDE CRYSTALS DURING FOOD PROCESSING

BACKGROUND OF THE INVENTION

1. Field of the Invention

This invention relates generally to food processing and to the refining of crystalline saccharides such as sugar, and more particularly it relates to the refining of crystalline saccharides in a process for making confections such as dark and milk chocolate, and ingredients therefor.

2. Brief Description of the Prior Art

Food products made from ingredients including a saccharide such as sucrose and an edible oil or fat such as cocoa butter are well known. An important group of these food products is comprised of confections, including candy.

Dark chocolate is a well known confection prepared from chocolate liquor, sugar and cocoa butter, and may include other ingredients. Milk chocolate is a chocolate which includes milk or milk solids as well. As used herein "chocolate" denotes both dark and milk chocolate. The process of making chocolate is reviewed generally in B. L. Zoumas and E. J. Finnegan, "Chocolate and Cocoa", *Kirk-Othmer Encyclopedia of Chemical Technology*, Vol. 6 (3rd Ed., Wiley-Interscience New York) 1-19.

As a confection, chocolate can take the form of solid pieces of chocolate, such as bars, and can also be incorporated as a component of other, more complex confections that are typically hollow items formed from chocolate, or confections which include chocolate as a coating upon a center ingredient of the confection, such as caramel, fruit pieces, nuts or the like.

The process of coating chocolate onto a confection is known as enrobing the piece. Enrobing is accomplished when the chocolate is in a fluid state, and a proper viscosity must be maintained in order to produce a satisfactory coated product.

Finished chocolate is a suspension of very fine particles (usually less than 50 micrometers) in fat. The particles consist of cocoa solids and crystalline sucrose as well as milk solids in the case of milk chocolate. Because of their prior processing, the cocoa solids are generally already fine enough before incorporation into the milk chocolate mixture. Milk solids require little size reduction. Sucrose, however, requires considerable size reduction, since extra fine grade sucrose, for example, typically varies in crystal size from about 400 micrometers to about one millimeter, with the greatest frequency of size occurring at about 750 micrometers. To satisfactorily function as an ingredient in chocolate, therefore, these sucrose crystals must be reduced in size to less than about 50 micrometers. Similar considerations apply in the processing of other types of confections.

It is known that the viscosity of chocolate increases in direct proportion to the amount of water present in the paste. This factor is normally controlled by eliminating water from the chocolate. Moreover, it is known that at least about fifty percent of the surface area of particles in milk chocolate is produced by the presence of particles below two micrometers in size. The presence of these ultrafine particles increases viscosity, and increasing amounts of cocoa butter (fat) are required to coat such particles in order for the chocolate to flow properly in manufacturing operations.

Processes for producing dark or milk chocolate can be either "wet," in which process condensed milk is employed, or "dry," in which process milk powder is used. In one "wet" process for making milk chocolate given in Bernard W. Minifie, *Chocolate, Cocoa and Confectionery: Science and Technology*, (The AVI Publishing Co., Inc., Conn., pp. 90-94, the following steps are carried out:

(1) Raw milk is filtered, cooled to about 40° F. and stored in large insulated stainless steel tanks.

(2) The milk is preheated to about 75° C. (165° F.) and concentrated to about 30-40% total solids by weight in a continuous evaporator.

(3) The total solids content of the milk is measured and sucrose is added to form a sugar/milk mixture. The mixture is transferred to vacuum pans. Condensation under vacuum at about 75° C. (165° F.) is permitted to occur until a total solids content of about 90% by weight is attained. Some sugar crystallization may begin to occur.

(4) Cocoa liquor is charged to a heavy duty mixer (e.g., a melangeur) and the condensed sugar/milk mixture is added gradually with mixing. The contents of the mixer are kneaded for 20-30 minutes giving a stiff paste. Crystallization of the sucrose continues to occur during kneading;

(5) The paste is placed in shallow trays and dried in a vacuum oven at about 75° C.-105° C. for 4-8 hours, depending on the heat transfer fluid (steam or hot water) used, to give a crumb.

(6) The crumb is mixed in a kneader with cocoa butter to give a coarse paste.

(7) The paste is "refined" (ground) by passing the coarse paste from the kneader through the nips of pairs of steel rollers to give a drier, powdery material. Refining mechanically breaks up crystalline sugar particles, fibrous cocoa matter, and milk solids. The paste is repeatedly passed through the refiner until a target particle size range is obtained (for fine chocolates, about 20-30 micrometers).

(8) The refined paste is mixed with flavoring materials such as vanillin, and cocoa butter is added to adjust viscosity, and an emulsifier such as lecithin may be added.

(9) The refined paste is "conched," that is, slowly kneaded or mixed at a temperature of from about 45°-55° C., to permit moisture and volatile acids to escape.

In view of the complexity of the just described wet process for making milk chocolate, a less complex dry process has been developed comprising the following steps:

A. Extra fine grade granulated sucrose, cocoa butter, chocolate liquor, and spray dried whole milk powder are combined and mixed.

B. The mixture from step (A) is passed repeatedly through the nips of a plurality of highly polished refining rolls, such that the sizes of the particles, especially the sucrose, are significantly reduced.

C. Step (B) can be repeated with finer roll settings such that particles smaller than 50 micrometers are produced.

D. The mixture is then stirred while heating to give the final desired consistency to the milk chocolate.

The just described process of steps A-D is obviously less complex than the former wet process, however it has been found that the particle distributions of the two processes differ, thereby producing milk chocolate having diverse flow characteristics. In the process embodying the step of dissolving sucrose in fresh whole milk, the sucrose is eventually recrystallized to a particle size range from about 10 micrometers to about 25 micrometers. In the process employing whole milk powder instead of fresh whole milk, there is obviously an absence of water to dissolve the sucrose crystals. Therefore, in passing through the refining rolls set to produce particles smaller than 50 micrometers, the sucrose crystals must first be reduced in size from an initial size of up to one millimeter to less than 50 micrometers. In fact, by using the technique of scanning electron microscopy (SEM), it has been found that such crushing of sucrose crystals produces many ultrafine crystals having a particle size below two micrometers, and that the particle count in such a process increases exponentially as the particle size decreases linearly. Moreover, sucrose particles that have been crushed look very much like broken glass, being irregular and having jagged edges, while sucrose crystals which have been dissolved in whole milk and recrystallized have the appearance of glass that has been fire polished. These two prior processes of producing milk chocolate are known to produce chocolate having different viscosity characteristics.

It is an object of this invention to provide a process for making food products including both at least one saccharide and at least one edible oil or fat that is both economical and which enables the viscosity characteristics of the product to be readily controlled. In the case of milk chocolate, the invention enables the more economical and modern dry process to produce product which, like the wet process, is rheologically more desirable than obtained in the dry process described above. In the case of dark chocolate, the invention enables this traditionally dry process to produce product with more desirable rheological characteristics.

It is an object of this invention to provide processes for preparing food products, such as confections, which comprise an improved manner of controlling saccharide crystal particle size distribution.

It is an object of this invention to provide milk and dark chocolates in which the fat content is reduced compared to the classical whole milk powder and classical dark chocolate processes.

SUMMARY OF THE INVENTION

We have now discovered a process for the production of food products such as confections which is a significant improvement over prior art processes and that can provide accurate control of the viscosity characteristics of both semi-processed ingredients and final food products. In the case of the production of chocolate, the process of the present invention provides a significant improvement over prior whole milk powder and dark chocolate processes, and also provides accurate control of the viscosity characteristics of confection pastes.

In the process of this invention, at least one crystalline saccharide, such as crystalline sucrose, is first blended with at least one edible oil or fat, such as cocoa butter, and a minor amount of water. This blend is refined to produce particles smaller than about 50 micrometers. In a presently preferred embodiment, the blend is refined by passing it at least once through the nip of at least one pair of refining rolls set to produce particles smaller than about 50 micrometers. The amount of water is predetermined so as to be sufficient to dissolve substantially all saccharide fine particles having a size less than about 5 micrometers. This refined blend is then heated with agitation to evaporate the minor amount of water, thereby causing recrystallization of the dissolved saccharide. There is thus provided a semi-processed ingredient comprising at least one crystalline saccharide, such as crystalline sucrose, dispersed in a fat, such as cocoa butter, which is suitable for further processing, or for use in the manufacture of other products.

BRIEF DESCRIPTION OF THE DRAWINGS

FIGS. 1 and 2 are electron micrographs of untreated crystals treated by a prior art process (controls).

FIGS. 3 and 4 are electron micrographs of sucrose crystals treated by an embodiment of the process of the present invention.

DESCRIPTION OF THE PREFERRED EMBODIMENTS

A presently preferred embodiment of the process of this invention for use in the production of milk chocolate comprises the steps of:

(a) forming a mixture of crystalline sucrose, cocoa butter and a minor amount of water;

(b) passing said mixture through the nip of at least one pair of highly polished refining rolls set to produce particles smaller than about 50 micrometers, said refining process normally producing an amount of crystalline sucrose fine particles having a size less than about 10 micrometers, whereby said minor amount of water is effective to dissolve sucrose particles having a size less than about 5 micrometers;

(c) agitating the refined product of step (b) under the application of heat sufficient to evaporate the minor amount of water and thereby cause recrystallization of the dissolved sucrose;

(d) combining with the mixture from step (c) amounts of melted chocolate liquor and whole milk powder;

(e) passing the combined mixture from step (d) through the nip of at least one pair of highly polished refining rolls set to produce particles smaller than 50 micrometers;

(f) adding sufficient melted cocoa butter to the mixture from step (e) to reach a predetermined fat content, while agitating this mixture with the application of heat until the desired milk chocolate consistency is obtained.

It is essential to the process of this invention that at least one saccharide ingredient be first refined in a mixture with a fat, such as cocoa butter, and water. In this manner, all of the water present will serve to dissolve the superfine saccharide particles to the predetermined extent desired. The whole milk powder and chocolate liquor, if present during such water refining, would compete for the available water more successfully than the saccharide particles. This would lead to undesirable side reactions and prevent accurate predetermination of the effective amount of water necessary to achieve saccharide fine particle dissolution.

The minor amount of water required to dissolve the superfine saccharide particles can be readily determined experimentally. Excess water, which would tend to dissolve the larger crystals of saccharide, is to be avoided. When the saccharide is sucrose and the fat is cocoa butter, it is preferred to use less than about ten percent water by weight of sucrose, more preferred to use less than about five percent water by weight of sucrose, and especially preferred to use about two percent water by weight of sucrose. The solubility of sucrose in water is such that two parts by weight sucrose will dissolve in one part by weight water.

When dark chocolate is being produced, the whole milk or dry milk powder is of course omitted. When other confections are produced, other types of fat can be substituted for cocoa butter in the process.

The at least one saccharide can be, for example, sucrose, another saccharide such as fructose or lactose, or a mixture of sucrose with another saccharide. The at least one fat can be cocoa butter, or another edible fat or oil such as mono-unsaturated, disaturated triglycerides (hard butters) isolated by fractionation of hydrogenated oils, naturally hard butters, or interesterified mixtures of fully hydrogenated coconut or palm kernel oils and fully hydrogenated cottonseed or other nonlauric oils.

Of course, the water refining step need not employ a roll mill, and other types of equipment effective for comminution of saccharide particles can be used.

The following examples illustrate the process of this invention:

EXAMPLE 1

799.97 grams of room temperature (20° C.) extra fine grade granulated sucrose are combined with 252.62 grams of melted cocoa butter at 40° C. and mixed for thirty seconds using a Hobart N-50 mixer using a Hobart stainless steel bowl and Hobart flat mixer paddle at speed no. 1. To the slurry formed are added 16.0 grams of distilled, deionized, room temperature water with a pipet while the slurry is under agitation on the Hobart N-50 mixer at speed no. 1. Mixing is continued for fifteen additional seconds after the addition of minor amounts of water. This watered slurry is then refined on a small 3-roll refiner, the roll gap having been set to produce particles smaller than 50 micrometers. Immediately after refining, the mass is agitated for two hours using a Hobart N-50 mixer in a stainless steel bowl with a flat paddle using speed no. 1, with a heat gun blowing hot air on the bowl so as to maintain the mass at a temperature of 51.7° C. To this heated mass are added 159.17 grams of melted chocolate liquor at 40° C. and 198.29 grams of spray dried whole milk powder, followed by mixing for 30 seconds using a Hobart N-50 mixer in a stainless steel bowl with a flat paddle on speed no. 1. Refining is again carried out on the small 3 roll refiner set to the same setting used for the first refining, taking care that only agglomerates are reduced in size. Then cocoa butter is added to the desired fat content and the mass agitated as before, but for four hours. Final rheology is adjusted by adding soya lecithin.

Four batches of milk chocolate were made using the process of Example 1, and the yield value and plastic viscosity were determined. Four other batches of milk chocolate were made using the prior whole milk powder process and comparable formulations, similar rheological or flow measurements being taken.

A comparison of these flow measurements is set forth in Table 1.

TABLE 1

| Batch Number | Yield Value (dynes/cm$^2$) | Plastic Viscosity (poise) |
|---|---|---|
| Prior Process | | |
| 1A | 89.1 | 26.1 |

TABLE 1-continued

| Batch Number | Yield Value (dynes/cm$^2$) | Plastic Viscosity (poise) |
|---|---|---|
| 1B | 54.7 | 31.5 |
| 1C | 65.8 | 29.3 |
| 1D | 79.9 | 28.2 |
| Mean | 72.4 | 28.8 |
| Process of Invention | | |
| 2A | 4.6 | 37.4 |
| 2B | 3.2 | 38.2 |
| 2C | 7.4 | 37.8 |
| 2D | 5.5 | 39.9 |
| Mean | 5.2 | 38.3 |

It is apparent from Table 1 that the milk chocolate produced in accordance with the process of this invention has significantly different flow characteristics from the comparable prior process. These flow characteristics have been found to be commercially improved and advantageous, and the process in accordance with this invention effects approximately a 1.5 percent savings in fat requirement (expressed as cocoa butter) compared to the prior process.

EXAMPLE 2

40.63 kilograms of room temperature (20° C.) extra fine grade granulated sucrose are combined with 12.83 kilograms of melted cocoa butter at 40° C. and mixed for thirty seconds in a pilot scale McCarter pug mill at a speed of approximately 50 rpm with a hot water jacket maintaining 51.7° C. To the slurry formed are added 0.8127 kilograms of distilled, deionized, room temperature water while the slurry is under agitation in the mixer. Mixing is continued for fifteen additional seconds after the addition of the minor amount of water. This watered slurry is then refined on a small 3 roll refiner, the roll gap having been set to produce particles smaller than 50 micrometers. Immediately after refining, the mass is agitated for two hours in a Petzholdt PVS-75 pilot scale conche, at approximately 50 rpm, with the hot water jacket maintaining the mass temperature of 51.7° C. To this heated mass are added 8.09 kilograms of melted chocolate liquor at 40° C. and 10.07 kilograms of spray dried whole milk powder, followed by mixing for 30 seconds in the Petzholdt PVS-75 at approximately 50 rpm. Refining is again carried out on the small 3 roll refiner set to the same setting used for the first refining, taking care that only agglomerates are reduced in size. Cocoa butter is then added to produce the desired fat content and the mass is agitated as before, but for four hours. Final rheology is adjusted by adding soya lecithin.

EXAMPLE 3

The superior results obtainable using the process of the present invention are illustrated by the Figures, in which electron micrographs of sucrose crystals treated by the process of the present invention are given (FIGS. 3 and 4) and are to be compared with electron micrographs of sucrose crystals (FIGS. 1 and 2) treated by a prior art process.

The sucrose crystals shown in FIG. 3 were prepared as follows. 799.97 grams extra fine grade sucrose and 252.62 grams cocoa butter were mixed to form a slurry. 16 ml water was then added to the slurry and the mixture was refined on a refiner with rolls set to provide a 55 micrometer gap. The refined mixture was then conched for two hours to give the sucrose particles shown in FIG. 3. The same process was used to give the sucrose particles shown in FIG. 4. A similar process was employed to produce the sucrose samples shown in FIGS. 1 and 2, except that no water was added to the sucrose/cocoa butter slurry. The electron microscopic sample preparation was the same for both the sucrose particles shown in FIGS. 1 and 2 and those shown in FIGS. 3 and 4. First, cocoa butter was removed in three washings using HPLC grade n-hexane with centrifugation. The separated sucrose crystals were dried at 40° C., then cooled under desiccation.

Having thus described our invention, we claim:

1. A process for refining crystalline saccharide into an ingredient suitable for incorporation into a food product comprising the steps of:
    (a) combining at least one crystalline saccharide with at least one edible fat and a minor amount of water to produce a blend;
    (b) refining said blend to produce particles smaller than 50 micrometers to produce a refined product, the refining step otherwise producing an amount of crystalline saccharide fine particles having a size less than about 5 micrometers when the minor amount of water is absent, whereby said minor amount of water is effective to dissolve saccharide particles having a size less than about 5 micrometers;
    (c) agitating the refined product of step (b) under the application of heat sufficient to evaporate the minor amount of water and thereby cause recrystallization of the dissolved saccharide;
thus producing a semi-processed ingredient which can be used to prepare a food product having improved viscosity characteristics.

2. A process according to claim 1 further including the step of producing a confection from the semi-processed ingredient.

3. A process according to claim 1 wherein the at least one fat is cocoa butter.

4. A process according to claim 1 wherein at least one crystalline saccharide is crystalline sucrose.

5. A process according to claim 1 wherein the blend produced in step (a) is refined by passing the blend through the nip of at least one pair of refining rolls set to produce particles having a size less than about 50 micrometers.

6. A process for the production of milk chocolate comprising the steps of:
    (a) forming a mixture of at least one crystalline saccharide, cocoa butter and a minor amount of water;
    (b) refining the mixture by passing said mixture at least once through the nip of at least one pair of refining rolls set to produce particles smaller than 50 micrometers to give a refined product, the refining step otherwise producing an amount of crystalline saccharide fine particles having a size less than about 5 micrometers when the minor amount of water is absent, whereby said minor amount of water is effective to dissolve saccharide particles having a size less than about 5 micrometers;
    (c) agitating the refined product of step (b) under the application of heat sufficient to evaporate the minor amount of water and thereby cause recrystallization of the dissolved saccharide;
    (d) combining with the mixture from step (c) amounts of melted chocolate liquor and whole milk powder;
    (e) passing the combined mixture from step (d) at least once through nips of at least one pair of refining rolls set to produce particles smaller than 50 micrometers;
    (f) adding sufficient melted cocoa butter to the mixture from step (e) to reach a predetermined fat content, while agitating this mixture with the application of heat until the desired milk chocolate consistency is obtained;
thus producing a milk chocolate having improved viscosity characteristics.

7. A process according to claim 6 wherein at least one crystalline saccharide is crystalline sucrose.

* * * * *